UNITED STATES PATENT OFFICE.

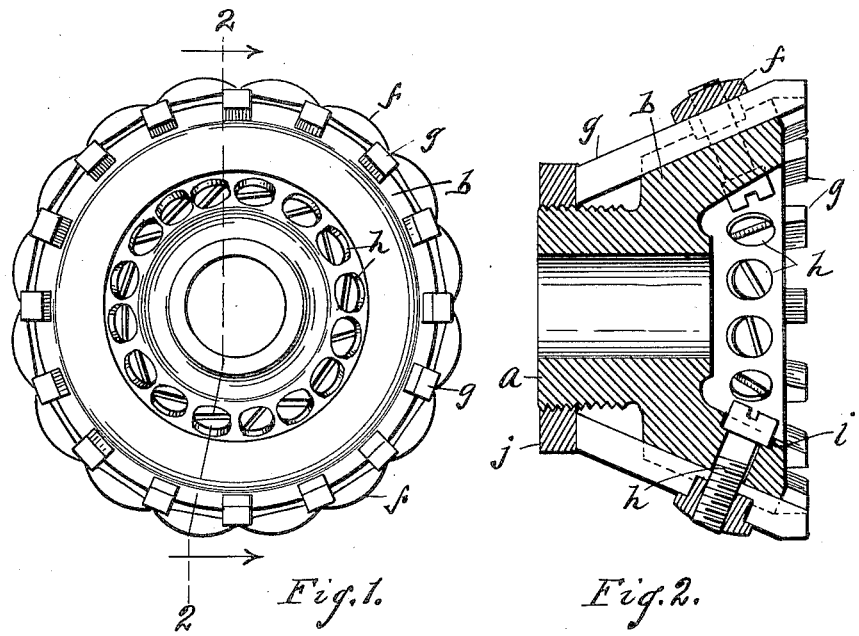
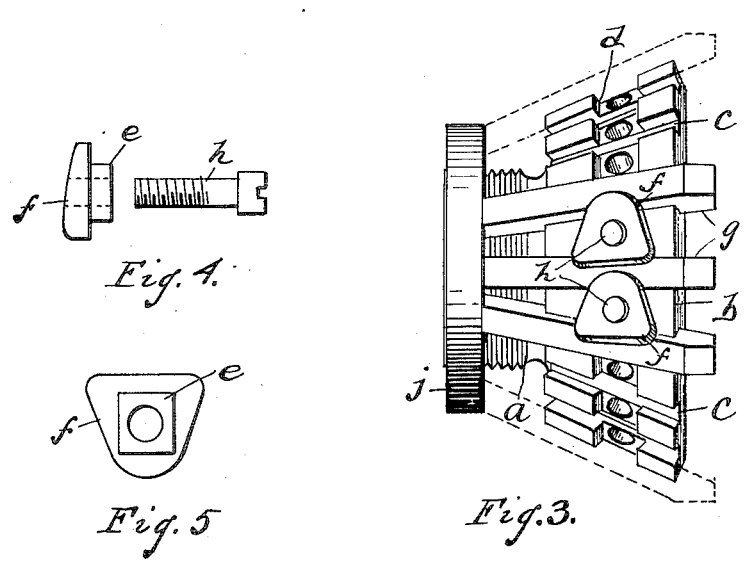

WILLIAM LUPU BRENNER, OF DETROIT, MICHIGAN, ASSIGNOR TO PRODUCTION TOOL CO. OF AMERICA, OF DETROIT, MICHIGAN, A CORPORATION OF MICHIGAN.

MILLING-CUTTER HOLDER.

1,319,458.    Specification of Letters Patent.    Patented Oct. 21, 1919.

Application filed November 18, 1918. Serial No. 262,918.

*To all whom it may concern:*

Be it known that I, WILLIAM L. BRENNER, a citizen of the United States, residing at Detroit, county of Wayne, State of Michigan, have invented a new and useful Improvement in Milling - Cutter Holders, of which the following is a specification.

This invention relates to a milling cutter holder and especially a surface milling cutter holder, and has for its object an assembly of the cutters upon the holder to give a maximum number of effective bearing points upon the cutters with a single tightening device.

In the drawings,—

Figure 1 is an end elevation.

Fig. 2 is a section on the line 2—2 of Fig. 1.

Fig. 3 is a side elevation showing part of the cutters in place and some of the cutter seats unoccupied.

Fig. 4 is a detail of the screw and nut tightening device.

Fig. 5 is a detail of the nut.

$a$ designates the body of the holder which comprises a hub exteriorly screw-threaded at one end and terminating in an outwardly flaring annular flange $b$ at the opposite end. This flange is exteriorly slotted to form the cutter seats $c$. Reaching annularly around the flange, and transversely of the seats $c$, is a groove $d$ which forms a plurality of seats for the squared portions $e$ of the nuts $f$. The outer end of the nut is in general conformation a triangular rim to form a three point bearing upon two adjacent cutters $g$. Any three points can be made to define a plane. Hence these nuts can always find a three point bearing upon two cutters regardless of irregularity. The screw bolts $h$ pass through perforations in the flange that are considerably larger than the shanks of the screw bolt and slightly larger than the heads of the screw bolt. Consequently the nut and screw, when not tightened, may wabble slightly to allow the nut to adjust itself to the three contact points with two adjacent cutters.

The perforations through the flange are countersunk at $i$ to provide shoulders to be engaged by the heads of the screw bolts $h$. All these countersunk portions are in the enlarged center opening formed in the holder by the flaring annular flange $b$. Hence all the bolt heads are seated on this enlarged opening in the face of the holder, as shown in Fig. 1.

The cutters can be slipped into their seats and adjusted to the desired projection by the adjusting ring $j$ which runs upon the threads of the hub of the holder. Thereupon the cutters may be tightened in place by inserting the screw bolts in the bolt holes and turning them into the nuts $f$ which are held from rotation by the trapeziform seats formed by the annular groove $d$. When these screw bolts are turned in to the limit of the power available, the nut bears tightly on two adjoining cutters, two bearing points on one cutter and a third bearing point on the other cutter substantially equally distant from the two first-mentioned bearing points due to the triangular conformation of the rim of the nut.

With the nuts locked from rotation by the squared seats, there is little likelihood of backing the screw bolt out of the nut to loosen it, for the nut is the member in contact with the cutters which are directly subject to the stresses.

What I claim is:

1. A milling cutter holder, comprising a body having an annular flange provided with cutter seats and perforated, cutters engaging in said seats, screw bolts disposed through said perforations in the flange with their heads on the inside, and nuts on the ends of the screw bolts for engaging against the cutters to hold them in place.

2. A milling cutter holder, comprising a body having at one end an annular flange which is perforated and also slotted to form cutter seats, cutters seated in said seats, and screw bolts passing through the perforations and having their heads on the inside of the flange, and nuts each having three point bearings on a pair of cutters and engaging the ends of said screw bolts.

3. A milling cutter holder, comprising a body having at one end an annular flange slotted and perforated and provided with an annular groove intersecting the slots, screw bolts passing through the slots with their heads on the inside of the flange, nuts having squared portions that fit into the nut seats formed by the annular groove in the flange and having a rim projecting over the squared portions, and cutters seated in the slots of the flange and held in place by the projecting rims of the nuts.

4. A milling cutter holder, comprising a body having at one end an outwardly flaring annular flange which is perforated, slotted and annularly grooved, screw bolts passing through the perforations, a nut having a squared portion seated in each nut seat formed by the annular groove and each nut having a projecting rim, and cutters seated in the slots and engaged in pairs by the rim of each single nut.

5. A milling cutter, comprising a body having at one end an annular flange slotted to form cutter seats, annularly grooved to form nut seats, and perforated for the passage of screw bolts, screw bolts loosely located in said perforations, nuts having squared portions fitting into the nut seats and having rim portions which are substantially triangular in conformation to give a three point bearing on two cutters, and cutters located in the cutter seats.

6. A milling cutter holder, comprising a body having an annular flange with a hub portion threaded on the outside, a ring running on the threads of the hub portion to act as a cutter adjuster, the said annular flange being exteriorly slotted to form cutter slots, cutters engaging in said seats and having their inner ends bearing against the adjusting ring, said annular flange being also perforated, screw bolts passing through the perforations and having their heads on the inside of the flange, and nuts running on the ends of the screw bolts and bearing against the cutters to hold them in their seats.

7. A milling cutter holder, comprising a body having at one end an annular flange slotted exteriorly and perforated, a plurality of cutters seated in said slots, nuts adapted to have three point bearing contacts with pairs of cutters, and screw bolts engaging in the said slots in the annular flange to force the nuts down into such bearing relations with pairs of cutters.

In witness whereof I have hereunto set my hand on the 12th day of November, 1918.

WILLIAM LUPU BRENNER.